United States Patent
Osofsky et al.

(10) Patent No.: US 6,724,840 B1
(45) Date of Patent: Apr. 20, 2004

(54) ADAPTIVE INTERFERENCE CANCELLATION METHOD

(75) Inventors: Samuel S. Osofsky, Torrance, CA (US); Paul E. Hanson, Huntington Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/551,969

(22) Filed: Apr. 15, 2000

(51) Int. Cl.[7] ............................. H03K 5/01; H04B 1/10
(52) U.S. Cl. ....................... 375/346; 455/296; 455/304; 330/149; 330/151
(58) Field of Search .......................... 375/346; 455/296, 455/304; 330/151, 149

(56) References Cited

U.S. PATENT DOCUMENTS

| | | | | |
|---|---|---|---|---|
| 3,970,944 A | * | 7/1976 | Huellwegen | 327/166 |
| 4,599,732 A | * | 7/1986 | LeFever | 375/346 |
| 5,729,829 A | * | 3/1998 | Talwar et al. | 455/63.1 |
| 6,052,420 A | * | 4/2000 | Yeap et al. | 375/346 |

* cited by examiner

Primary Examiner—Stephen Chin
Assistant Examiner—Sudhanshu C. Pathak
(74) Attorney, Agent, or Firm—Derrick Michael Reid

(57) ABSTRACT

The design and performance of an analog cancellation system is presented. The system generates either narrow or wideband nulls in order to minimize the effect of interfering signals on a receiver. A microcontroller directs the detection and classification of the interfering signal relative to frequency, amplitude and modulation, such as pulse-width or continuous wave modulation. A sampled version of the interfering signal at frequency, fi, is phase-inverted, amplified, and vector-summed with the input signal stream to null the interfering signal at fi. The microcontroller also monitors and adjusts the cancellation systems' circuit parameters to minimize any residual interfering signal at fi or respond to changes in the interference. The example system operates from 100–160 MHz, and can generate wideband nulls over a 5MHz bandwidth with a 15dB depth attenuation or narrowband nulls with a Q greater than 200, and with a null depth greater than 30dB.

11 Claims, 6 Drawing Sheets

ANALOG NULLING AND DETECTION CIRCUIT

ANALOG NULLING AND DETECTION CIRCUIT

DIGITAL CONTROL CIRCUIT

TUNABLE BANDWIDTH BPF

ADAPTIVE NULLING FLOW DIAGRAM

NARROW BAND AMPLITUDE
TRANSFER FUNCTIONS

NARROW BAND PHASE
TRANSFER FUNCTIONS

WIDE BAND AMPLITUDE
TRANSFER FUNCTIONS

WIDE BAND PHASE
TRANSFER FUNCTIONS

WIDE BAND
RECEIVED SIGNAL

CANCELLED WIDE BAND
OUTPUT SIGNAL

NARROW BAND
RECEIVED SIGNAL

CANCELLED NARROW BAND
OUTPUT SIGNAL

ADAPTIVE INTERFERENCE CANCELLATION METHOD

STATEMENT OF GOVERNMENT INTEREST

The invention was made with Government support under contract No. F04701-93-C-0094 by the Department of the Air Force. The Government has certain rights in the invention.

FIELD OF THE INVENTION

The present invention is related to interference cancellation in communication systems. More particularly, the present invention is related to the implementation of an adaptive variable-bandwidth integrated interference cancellation system that minimizes the effects of undesired signals on receiver performance.

BACKGROUND OF THE INVENTION

A receiver can be subjected to undesired signals that are present over an operating bandwidth. Interfering signals can degrade the performance of wideband communication receivers. The undesired signals could be intentionally generated in order to jam or disrupt the receiver performance, or simply exist as a part of the surrounding signal environment. The interfering signals are classed as cosite or remote interferers. A cosite interferer is physically collocated with the receiver permitting a physical circuit connection from the interference generator to the receiver. A remote interferer is located far enough from the receiver to preclude a physical circuit connection. It is desirable to null interfering signals for improved performance. The design of the receiving antenna connected to the receiver and the physical separation between the interferer and the receiver antenna significantly affects the choice of the interference suppression system.

Often, adaptive antenna null-pattern generators are applied in order to minimize the effect of the unwanted signals on receiver performance. In other cases, the pattern of the antenna is not or cannot be adjusted. Instead, a sample of the interfering signal that is generated at a known location and having specific signal characteristics is obtained from an auxiliary antenna for the case of remote interference, or directly coupled from an interfering transmitter for the case of cosite interference. The system requires an auxiliary antenna, directional coupler, or multi-horn antenna to extract the interfering signal. The auxiliary antenna can be one of the horns in the main aperture of a multihorn array. However, some antenna systems have limited capabilities that adjust the antenna characteristics for obtaining a sample of the interfering signal through a known input location of the antenna system. One method of removing the interference is when the received signal is digitized and digital signal processing circuits can be used to filter out the undesired signals. Some receiver systems have limited processing capabilities for applying digital filtering techniques to a digitized version of the received signal. Instead all signals in the operating bandwidth are received, and adaptive filtering techniques are applied to these received signals to minimize the amplitude of any received but undesired signal. In this case, the undesired signal must first be detected, according to predefined criteria, and then isolated from the desired signals.

The general nulling function is well known and has been used in existing antenna systems. For Example, U.S. Pat. No. 5,729,829 discloses an interference mitigation method and apparatus for multiple collocated transceivers for band filtering of unwanted signals. Usually, a reference signal consisting of a non-coherent but correlated version of the undesired signal is obtained. The amplitude of the reference signal is equal to the amplitude of the interfering signal. The phase of the reference signal is set to 180° different from the interfering signal so that when the reference signal is reinjected back into the received signal, the undesired signal is cancelled in order to create a transmission null at the location of the undesired signal. When the receiver is collocated with the interference, a portion of the interference signal can be coupled from the transmission path by a directional coupler or another physical connection. This sampled signal is phase-shifted by 180° and vector-summed with the received signal. The 180° phase shift is produced by a vector modulation circuit. This vector sum is adaptively adjusted to produce a null at the frequency of the interfering signal.

One method uses transversal filters and mixers to generate the canceling signal. Another method uses a personal computer and a computation intensive routine to control a programmable transversal filter that detects the undesired signal. In these cases, the reference signals are obtained by coupling through additional antennas or by special connections to the interference source. Antenna arrays are used in communications systems. The signals from the array elements are vector summed together to produce the received signal. With adaptive control, the array can adjust the antenna pattern to minimize the effect of remote interference. The adaptive adjustment of the phase and amplitude weights of the array elements generates an antenna pattern null in the direction of the interfering signal. In other cases, a main antenna is combined with auxiliary antenna elements as a sidelobe canceller. In this case, the interfering signal is sampled by the broadbeam auxiliary antennas placed near the main antenna. The vector sum of the auxiliary antenna signals and the main antenna signal is adaptively processed to null the interference. The success of these adaptive antenna techniques depends on an ability to resolve the locations of the desired and interfering signals, and provide equalization to achieve effective interference over the required bandwidth. In many cases, sufficient space is unavailable to implement an array large enough to resolve the desired signals and remote interference. A wideband communication applications might preclude channelizing the operating bandwidth by a fixed channelization scheme or by a tunable bandpass filter, or by a lack of sufficient dynamic range to process large signal amplitudes. The above nulling systems use only relative signal power to determine whether a received signal is to be nulled. Adaptive filtering techniques could be applied to the unknown signals, but these techniques require initial conditions in the filter that depend on the characteristics of the received signals.

Usually prior cancellation methods require adjustment of the antenna pattern to create nulls for cancellation of unwanted signals, or external feeds containing unwanted signals that are then cancelled. In both cases, apriori knowledge is required. These prior methods typically use a narrowband tunable bandpass filter as a preselector at the front end of the receiver. The front-end preselector has a disadvantage in a wideband communications receiver. The narrowband preselector would filter out most of the desired signal along with an interfering signal. Series tunable bandnotch filters could be placed before the receiver. The bandpass and bandnotch filtering methods are serial in-line processes that reduce the reliability of the receiver. When the tuning mechanism in the preselector fails, the filter may lock at one center frequency, other signals cannot be received. The disabled filter would then significantly and permanently degrade receiver performance in part of the passband. These and other disadvantages are solved or reduced using the invention.

SUMMARY OF THE INVENTION

An object of the invention is to provide cancellation of unwanted received signals received by a communication receiver Another object of the invention is to provide cancellation of unwanted signals having predetermined frequency, amplitude and modulation criteria.

Yet another object of the invention is to provide scanning by searching selected frequencies for unwanted signals having predetermined frequency, amplitude and modulation criteria and to cancel the located unwanted signals to result in desired received signals.

Still another object of the invention is to provide an adaptive variable bandwidth cancellation system for isolating and canceling unwanted signals having predetermined frequency, amplitude and modulation criteria.

The present invention is directed to a microcontroller based adaptive variable-bandwidth cancellation system for use in a wideband communication receiver system. The cancellation system is placed in parallel with and becomes part of a receiver. The use of a microcontroller allows for flexibility in defining the characteristics of the interfering signal. The preferred cancellation system provides narrowband and wideband cancellation nulls for canceling unwanted interfering signals. The limitation on null depth is caused by the finite resolution of the phase-shift transmission lines and attenuation steps. The signals within the scanned frequency bandwidth are detected in a detection path and parameterized according to frequency, amplitude or modulation, such as pulse-width modulation or continuous wave modulation. These characteristics are then compared against the definition of an undesired signal that is stored in the microcontroller. When an undesirable signal is detected, a tunable reference path is set so as to cancel the undesirable signal from the received signal and so as to reduce the undesirable signal detected signal. Iterations of detection and cancellation achieve desired cancellation of the unwanted signal using adaptive cancellation. The detection path is tunable for scanning across step bandwidths for detecting unwanted signals of interest. Once an undesirable signal is located at a particular frequency location, the tunable reference path is tuned to that particular frequency location to isolate the undesired signal that is then inverted and added to the composite receive signal to cancel the unwanted signal from the composite receive signal to provide only desired received signal with the detected unwanted signal canceled. The reference path serves to isolate an undesired signal from the desired signals, and then serves to amplify and shift the phase of the undesired signal for nulling summation with the original received signal that is delayed for coherent nulling. Once an undesired signal has been detected, the microcontroller sets the values of the reference path components according to a predetermined look up table. The undesired received signal is continuously fed into the detection path for monitoring the effect of the cancellation and when further cancellation is needed, the reference path is appropriately tuned to remove the undesired signals. The microcontroller adaptively continuously scans the receiver bandwidth and monitors the detected signal from the detection path searching for unwanted interfering signals, and characterizes the detection signals, and then tunes both reference path and detection path circuit parameters to maximize detection of unwanted signals to minimize the amplitude of an undesired signal in the surviving received signal. The microcontroller-based system is preferred for signal detection and evaluation. Undesired signals are detected and isolated at a location internal to the cancellation circuitry. Tunable bandwidth bandpass filters in the detection path and reference path are used to generate wideband or narrowband nulls depending on the signal characteristics. The controller continuously monitors the cancellation result by sensing the detection signal from the detection path, and adaptively minimizes any residual of the interfering signal.

The use of a programmable microcontroller allows for flexibility in the detection and classification of interfering signals. In the preferred form, the microcontroller searches for either narrowband or wideband signals. Detection threshold amplitudes can also be varied as a function of frequency. The cancellation system can be used in space or airborne applications wherein weight, size, and power are prime considerations. The system also has applications in the commercial sector where receivers, such as GPS receivers, are used near emitters at the same frequency or at multiple harmonics of television or radio station frequencies. The microcontroller can be efficiently programmed without floating-point mathematics, matrix inversion, or other higher mathematical functions. The controller can be programmed so that different classes of signals are cancelled depending on signal parameters, such as frequency, pulse-width, and amplitude a stand alone configuration with external controls. In the event of system failure, the cancellation function can be disabled without affecting reception of the received signal by the operating receiver.

The microcontroller enables flexible programming and adaptive control allowing for compensation of component performance drift over lifetime and environments in which the system cannot be reached for manual repair or replacement of parts. Flexible control of the signal detection system allows for a relatively large detection range of over 60 dB using amplitude detection techniques. The null also can be located within a wide bandwidth according to a relatively coarse calibration table. The microcontroller can then measure the null efficiency and adjust the cancellation performance to improve the null. In an exemplar form, the system can generate 5 MHz wideband nulls with 15 dB in cancellation or narrowband bandwidth nulls with 30 dB in cancellation over a 100 MHz to 160 Mhz operating bandwidth. These and other advantages will become more apparent from the following detailed description of the preferred embodiment.

DETAILED DESCRIPTION OF THE PREFERRED EMBODIMENT

Figure 1A:
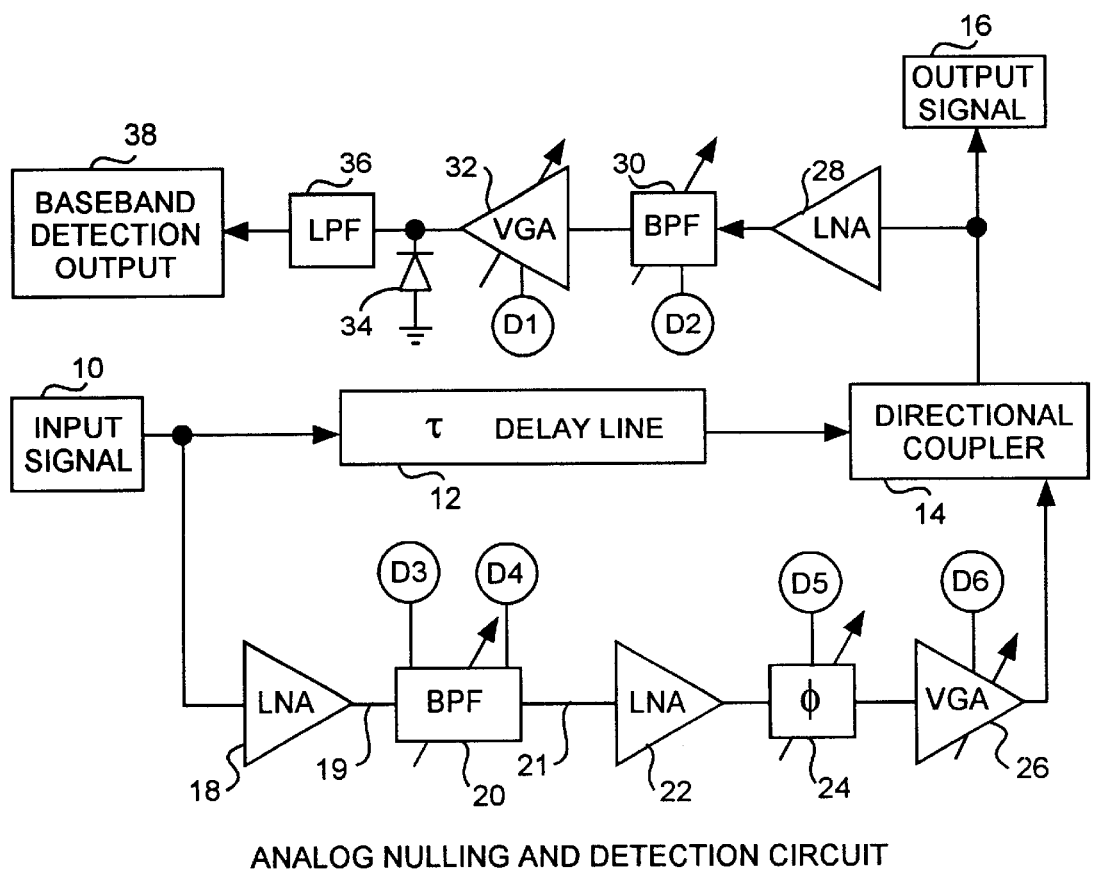
FIG. 1A is a schematic of an analog nulling and detection circuit.

An embodiment of the invention is described with reference to the figures using reference designations as shown in the figures. Referring to FIG. 1A, an analog nulling and detection circuit receives and processes an input signal 10. The input signal 10 contains both desired and undesired signals that are collected by an input antenna. The input signal 10 is received and communicated through a delayed path consisting of a time delay 12 to provide a delayed input signal to a directional coupler 14, and communicated through a reference path consisting of a first low noise amplifier (LNA) 18 providing a reference bandpass filter input signal 19, a reference bandpass filter (BPF) 20 providing a reference BPF output signal 21, a second reference LNA 22, reference phase shifter 24 that may be a switched delay line, and a variable gain amplifier (VGA) 26 providing a reference signal communicated to the directional coupler 14. The directional coupler 14 receives the delayed input signal from delay 12 and receives the reference signal from the VGA 26 and couples these two signals together to provide an output signal 16. The output signal is communicated through a detection path consisting of a detection LNA 28, a detection BPF 30, a detection VGA 32, a square law diode 34, and a detection lowpass filter 36 that provides a baseband detection output signal 38. The detection BPF 30 is used to sweep frequency bands of interest for detection of undesired signals within each stepped frequency band. The baseband detection output 38 indicates the presence of desired and undesired signals within the frequency band selected by detection BPF 30. The output of the 10 dB directional coupler 14 is firstly communicated to the output 16. A sensed portion of the output 16 is communicated through the LNA 28, the tunable BPF 30, the VGA 32, square-law diode 34 and LPF 36 of the detection path in order to detect the presence and frequency of an undesired signal. The LNA 18, 22, and 28 may be CLC449 current-feedback op-amps to provide gain and high input impedance. In order to minimize loss in the delay path, the input signal 10 and the output signal 16 are connected to high input-impedance amplifiers 18 and 28. Furthermore, if the active components in the reference and detection paths are disabled, the paths do not load the delay path.

The detection VGA 32 and detection BPF 30 are respectively controlled by a D1 analog control signal and a D2 digital control signal. The reference BPF 20 is controlled by D3 and D4 analog control signals. The reference phase shifter 24 and VGA 26 are respectively controlled by digital control signal D5 and analog control signal D6. The D1 and D2 signals are used to control the operation of the detection path consisting of elements 28, 30, 32, 34 and 36. The D3, D4, D5 and D6 signals are used to control the operation of the reference path consisting of elements 18, 20, 22, 24 and 26. D1 is an analog gain setting signal. D2 is a digital bandpass tuning signal. D3 is an analog BPF bandwidth tuning signal. D4 is an analog BPF center frequency setting signal. D5 is a digital phase shift adjustment signal. D6 in an analog gain setting signal. In operation, the delay 12 is matched to the delay through the reference path, so that input signal 10 and the reference signal from the VGA 26 are time synchronized upon additive reception by the direction coupler 14 providing minimum insertion losses to the output signal 16 that is the sum of the input signal 10 and the reference signal from the VGA 26. The reference path serves to shift by 180° the input signal 10 with appropriate gain and phase so as to cancel unwanted interference signal within the input signal 10 thereby converting the input signal 10 into the output signal 16 having canceled interference. For minimizing insertion losses, the directional coupler 14 maybe a conventional splitter that is reversibly connected so that the delayed input signal is received at the splitter output, the reference input from VGA 26 is received at the −10 db output of the splitter 14, and the output signal 16 is provided at the input of the splitter. The delayed signal from the delay 12 and the reference signal from the reference path are set to have matched delays for coherent combining in the directional coupler 14. The delay 12 may be, for example, 17 ns to match the delay through the reference path. The reference signal transits the reference path, while the delayed signal passes through the 17 ns delay line 12 and into the nominal output port of the 10 dB directional coupler 14. The nominal output port and coupling ports are used as inputs, while the nominal input port is used as an output. In this manner, isolation is provided between the reference and delay signal paths, along with approximately 2.5-dB less insertion loss over an alternative conventional 3-dB coupler.

The output of the reference BPF 20 is then fed into the phase shifter 24. The phase shifter, for example, may consist of two amplifier channels, not shown, one of which can be chosen at a time. One amplifier channel is designed as an inverting amplifier while the other channel is designed as a noninverting amplifier. The output of this circuit is then fed to a switched delay line, not shown. Any or all of the six delay lines can be switched into the reference path as necessary. The delay lines have nominal electrical lengths of 90°, 45°, 22°, 11°, 60° and 3° at 100 MHz. Thus, a phase shift of 360° can be achieved through the combined use of one of the channels and the switched delay line. The output of the phase shifter 24 is then fed into the VGA 26 that may be a CLC522 VGA. The VGA is used to adjust the reference path signal level. During the detection signal scanning, the VGA 26 is set to maximum attenuation. Additional gain stages, not shown, may be used to increase the reference path signal level for injection into the coupled port of the 10 dB directional coupler 14. All of the signal levels, even at the input to 10 dB directional coupler 14, are considerably below the 1 dB compression and third order intermodulation intercept points of the active components.

Figure 1B:
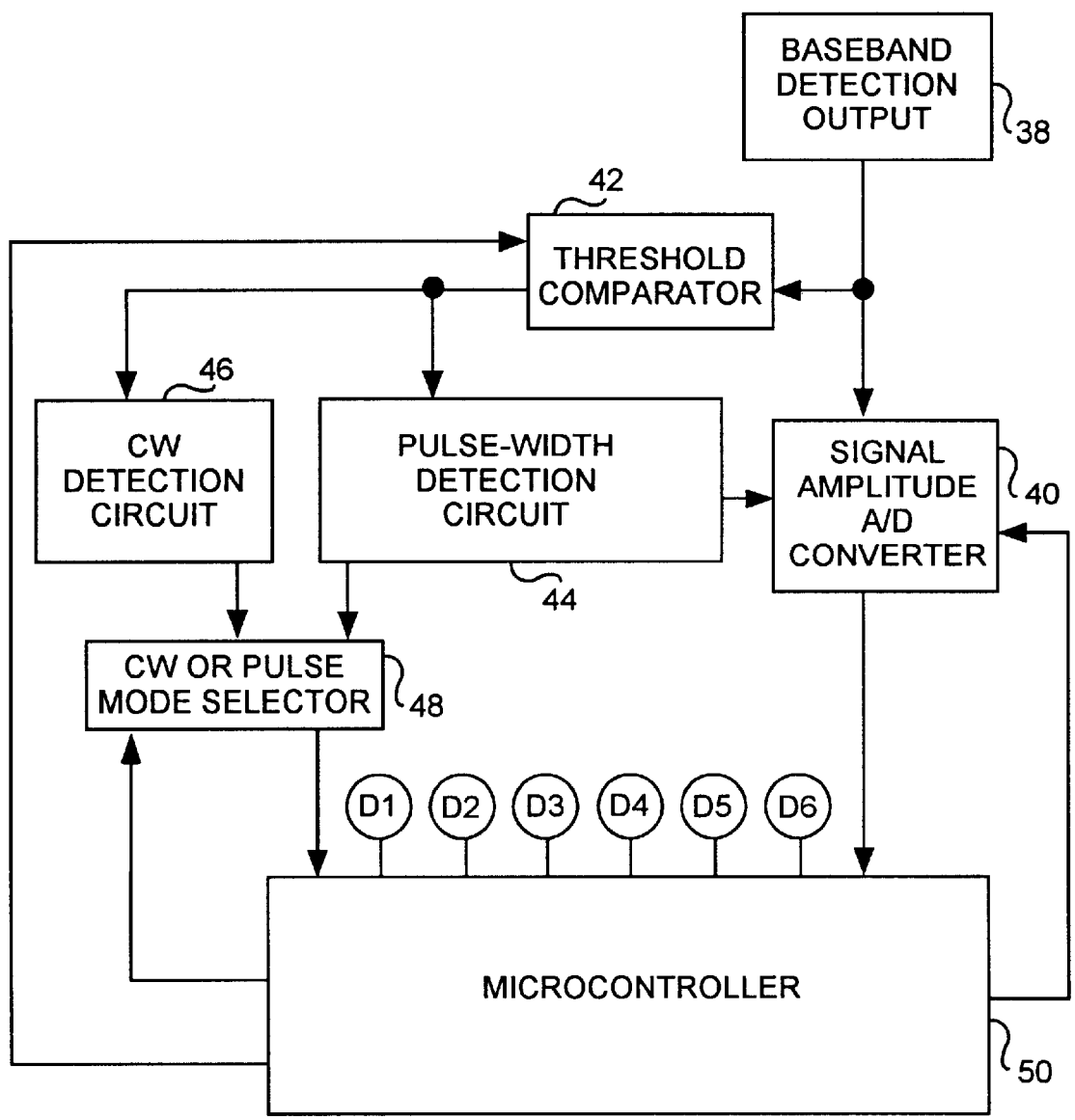
FIG. 1B is a block diagram of a digital control circuit.

Referring to FIGS. 1A and 1B, and more particularly to FIG. 1B, a digital control circuit is used to control the operation of the analog nulling and detection circuit of FIG. 1A, so that interference in the reference path is canceled from the input signal 10 as the output signal 16. The digital control circuit receives the baseband detection output 38 and provides the control signals D1–D6 to the detection and nulling circuits. The baseband detection output 38 is received and converted by a signal amplitude analog to digital converter 40 providing a sample and hold signal that includes a sign value and an amplitude value. The baseband detection output 38 is also received by a threshold comparator 42 providing a threshold comparator output to a pulse width detection circuit 44 and to a continuous wave (CW) detection circuit 46. The comparator 42 provides an output that indicates if a signal has been detected. The detection circuits 44 and 46 provide respective CW and pulse outputs to a selector 48 that selects the CW or pulse output from the CW and pulse circuits 46 and 44, respectively, and then communicates the selected output to a microcontroller 50. The microcontroller 50 received the sampled output from the converter 40, the selected output from the selector 48 as inputs and provides control signals to the comparator 42, converter 40 and selector 48, as well as providing the digital control signals D1–D6. The microcontroller 50 controls the operation of the comparator 42 by providing a threshold level signal that is varied depending on how small a detected signal is to be detected above a noise floor. The digital control circuit implements an automated analog cancellation or nulling method that generates narrow and wideband nulls in order to minimize the effect of undesired interference signals on a received signal 10. The control circuit detects and isolates the undesired signal by controlling the operation of the detection path and reference path. The digital control circuit does not rely on apriori information about the undesired signal. The control circuit allows all desired input signals of input 10 to pass through to the output 16, while nulling, that is canceling, the undesired signals using the reference path.

The baseband detection signal 38 is communicated to the cw detection circuit 46 and to the pulse detector circuit 44. These detectors 44 and 46 provide an active output if the baseband detection signal exists above the threshold value of the comparator 42 as controlled by the microcontroller 50. If the detected signal exceeds the threshold value, the detected signal is categorized as a desired or undesired signal, and as a pulsed or as a cw signal, and the amplitude and sign of the signal from the converter 40 as well as the current values of the detection control signal D1 and D2 for the detection signal are then used to determine through look up tables, the values of the nulling control signal D3, D4, D5 and D6 used in the reference path for cancellation. Additionally, microcontroller 50 can determine if a pulse signal is less or greater than a predetermined value, and any pulsed signal longer or shorter than this value, respectively, and any cw signals are designated as undesired signals can be nulled as well.

The null generation is achieved by summing outputs of the delay path and the reference path at a given frequency or over a given frequency band. The undesired signals in the delay path and the reference path must have the same amplitude within an amplitude offset but phase shifted by 180° within a phase offset. The reference path has a frequency response defined by components within the reference path including the BPF 20. The BPF 20 in the reference path is required to isolate the undesired signal from the desired signal within a given bandwidth but having associated group delays. The BPF 20 has an amplitude response that is not flat over the operating bandwidth and the phase length in the reference path is larger than that of the delay path. The BPF 20 affects the amplitude and phase of signals in the band so that phase shifting by shifter 24 and variable gain by the VGA 26 is required to match the isolated signal in the reference path to the unwanted signal in the delay path for cancellation. A detailed circuit diagram of the tunable bandwidth BFP 20 is shown in FIG. 2.

Figure 2:
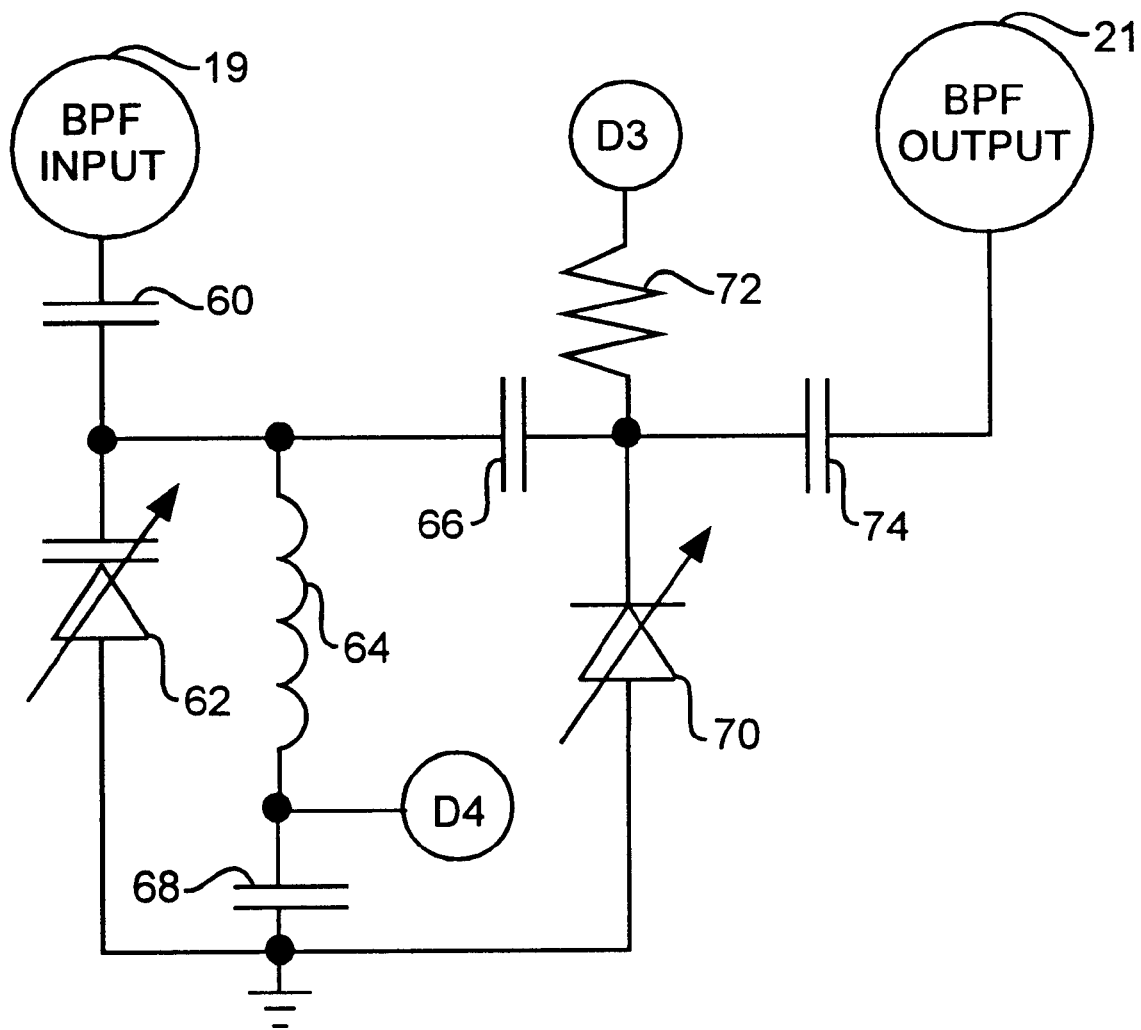
FIG. 2 is a schematic of a tunable bandwidth bandpass filter.

Referring to FIGS. 1A, 1B and 2, and more particularly to FIG. 2, the BPF 20 provides tunable filtering. The BPF input 19 is communicated through a first DC block capacitor 60 to a MV209 varactor diode 62 functioning as a tuning element. The diode 62 is connected to an inductor 64 and a second DC blocking capacitor 66. The inductor 64 is connected to a bypass capacitor 68. The diode 62, inductor 64 and capacitors 60, 66, and 74 are tuning elements for tuning to a desired band controlled by the control signal D4 that sets the center frequency of the desired band. The second DC blocking capacitor 66 is connected to an HP5082-3081 diode 70 functioning as a current-controlled resistor. The diode 70 allows adjustment of the isolation BPF passband amplitude flatness and group delay. The diode 70 is connected to a resistor 72 that is controlled by the control signal D3 that controls the bandwidth of the bandpass. The resistor 72 and diode 70 are further connected to a third DC blocking capacitor 74 that provides the BPF output 21. The three series capacitors 60, 66, and 74 provide DC blocking and affect how the passband of the BPF is shaped. Tunable wideband nulls were generated when the diode 70 functioning as a current controlled rectifier (CCR) with a control voltage set to predetermined nonzero values.

Figure 3:
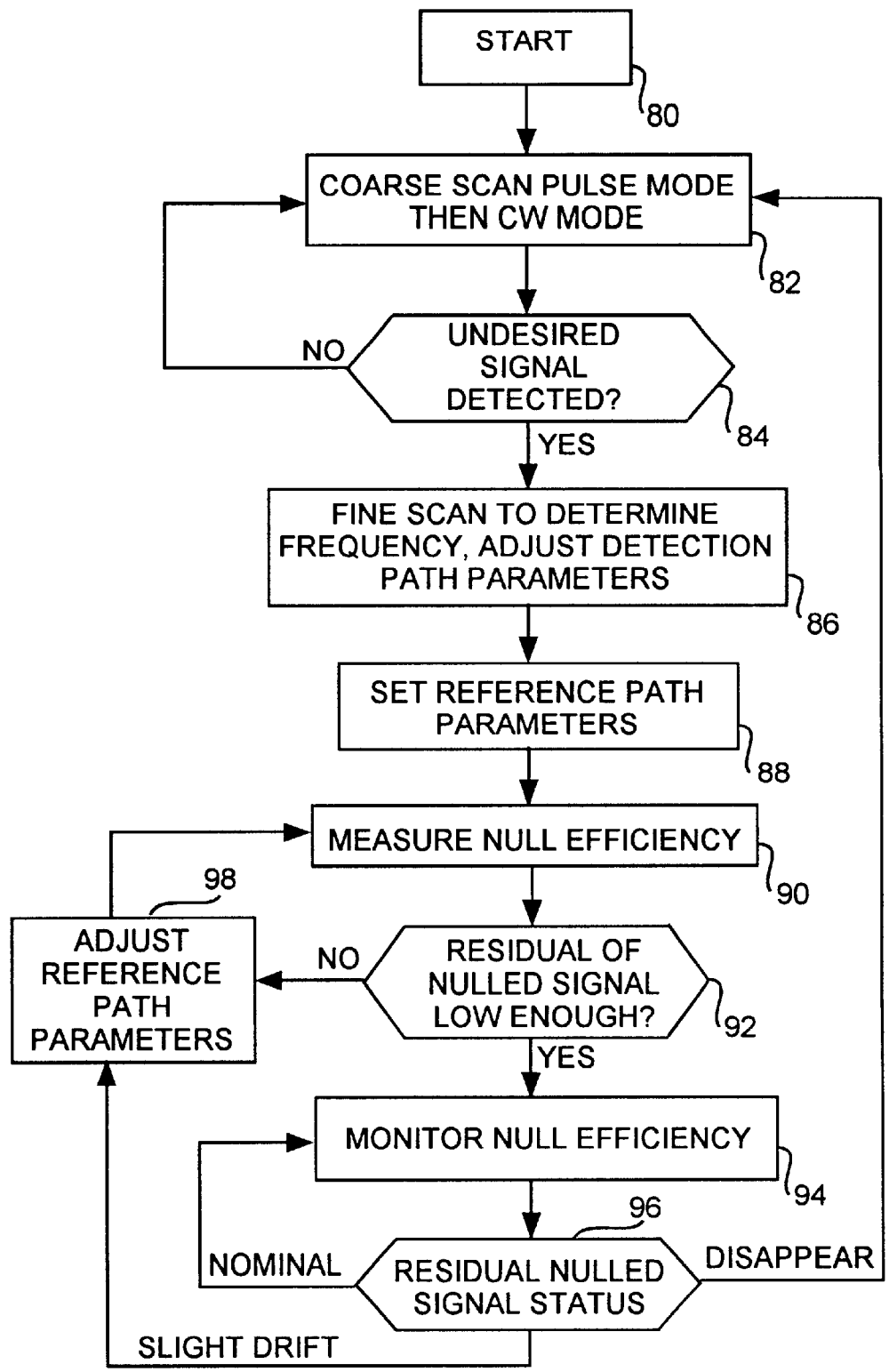
FIG. 3 is an adaptive nulling flow diagram.
Figure 4A:
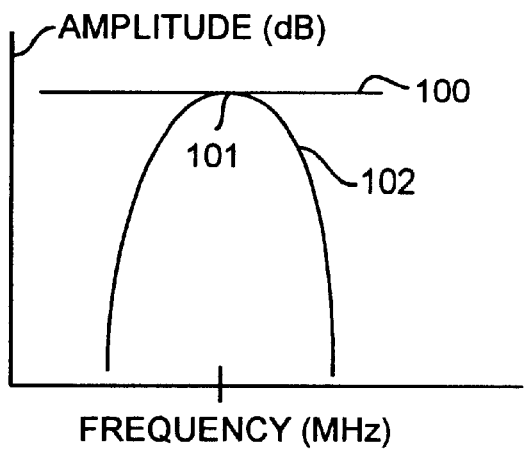
FIG. 4A is a graph of a narrowband amplitude bandpass filter transfer function.
Figure 4B:
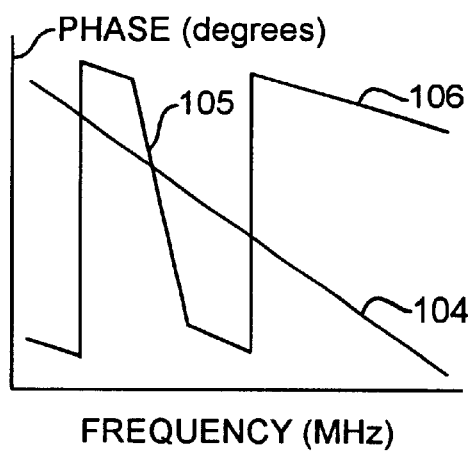
FIG. 4B is a graph of a narrowband phase bandpass filter transfer function.
Figure 5A:
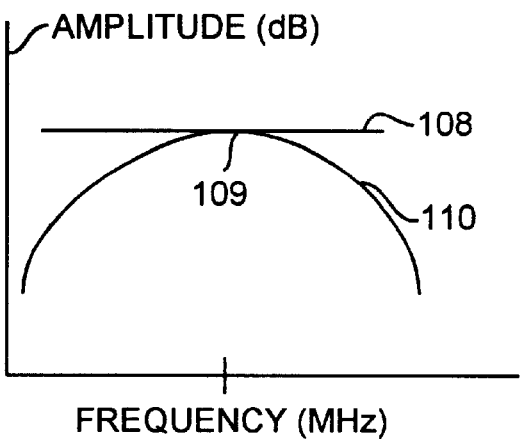
FIG. 5A is a graph of a wideband amplitude bandpass filter transfer function.
Figure 5B:
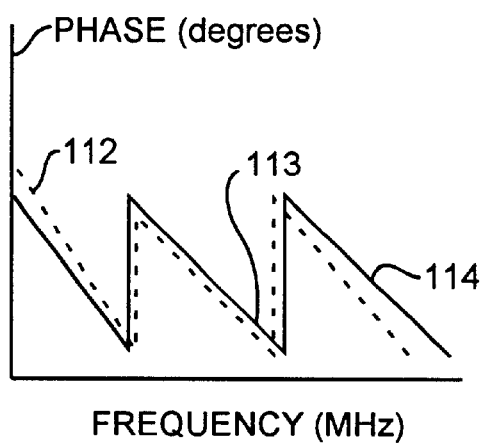
FIG. 5B is a graph of a wideband phase bandpass filter transfer function.
Figure 6A:
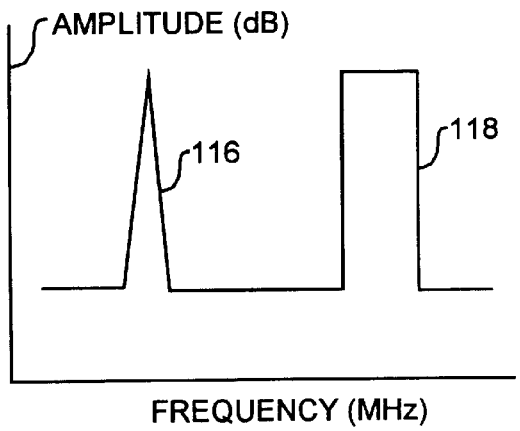
FIG. 6A is a graph depicting a wideband received signal.
Figure 6B:
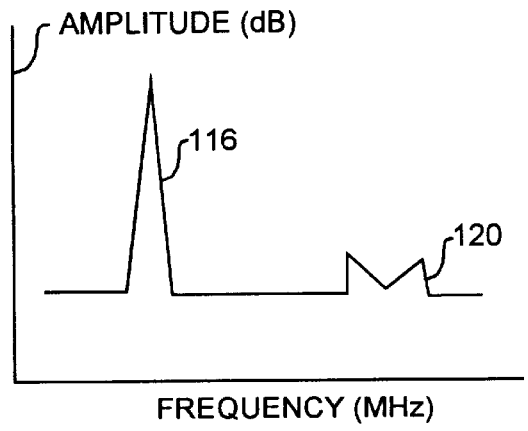
FIG. 6B is a graph depicting the wideband received signal with signal cancellation.
Figure 7A:
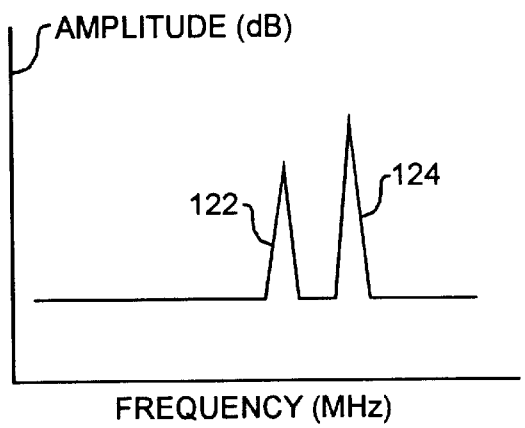
FIG. 7A is a graph depicting a narrowband received signal.
Figure 7B:
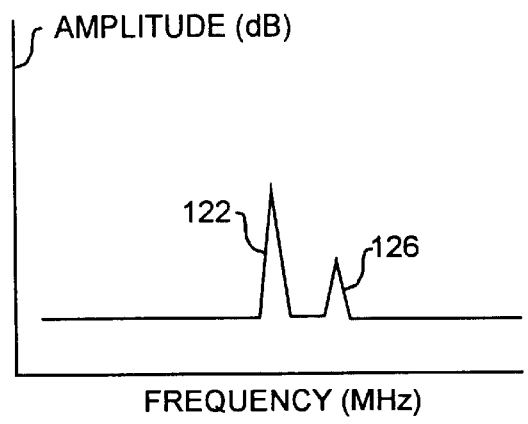
FIG. 7B is a graph depicting the narrowband received signal with signal cancellation.

Referring to FIGS. 1A, 1B, 2, and 3, and more particularly to FIG. 3, the microcontroller routines for detecting, setting the initial reference-path parameters, and adaptively controlling the null depth are performed under program control that start 80 with the reference path effectively disabled using control signals D3, D4, D5 and D6, without any nulling of the delay signal. The microcontroller has several standard operational routines. The microcontroller is set up to continually coarsely scan the operating bandwidth for undesired signals. Once an undesired signal is detected, a fine-frequency scan is conducted in order to more accurately locate the undesired signal. Next, the microcontroller sets up the reference path parameters according to predefined look up tables. The residual of the nulled signal is the baseband detection signal 38 that is used as a feedback input to a closed loop nulling system. After setting the reference path parameters, the microcontroller 50 then polls the output value of the analog to digital converter 40. If the residual of the nulled signal is not small enough, the microcontroller adapts the reference path parameters including a reference BPF 20 providing a tuning location, gain tuning value of VGA 26, and phase delay values of the phase shifter 24 to reduce the value of the residual null signal even further. Once the microcontroller 50 has achieved the best possible null, the controller monitors the results. If the signal drifts in frequency or power, the controller adapts the null to these conditions. Certain defined conditions, such as loss of signal, will cause the microcontroller to return to the search mode. Multiple nulls can be generated if multiple reference signals are obtained through the use of a power divider instead of the current single arm coupler using a plurality of reference paths. The microcontroller 50 can then cycle through setting up each reference path to generate a null at different locations.

The microcontroller 50, that may be an RPC-2300 development system, causes the tunable detection path BFP 30 to scan the input frequency band in coarse steps 82 by using control signal D2. At each frequency step, the output signal of the signal detection path BPF 30 is sampled 84 using the converter 40 and the value of the detected signal 38 is read by the microcontroller 50. The amplitude of the detected signal 38 can be controlled using the control signal D1 so as to prevent saturation of the diode 34 or so as to amplify small amplitude undesired signals. After the entire frequency band has been scanned, the microcontroller 50 decides whether an undesired signal has been detected. The signals must meet certain criteria in order to be considered undesired signals. A VGA 32 adjusts the input signal level to the square law detection diode 34 in order to increase the range of detectable signals. When an undesired signal has been detected 84, the signal may be classified by amplitude, frequency, and pulse or CW mode. After an undesired signal has been detected in the coarse scan steps, a fine-frequency scan 86 occurs in order to determine the detected bandwidth and center frequency of the undesired signal. After detecting the undesired signal in the detection path, the microcontroller set the parameters 88 of the reference path to generate a null of the undesired signal. A look up table can be used to cross reference the frequency, amplitude and mode to values of the control signal D3, D4, D5 and D6 for controlling the operation of the reference path. After setting the reference path parameters by controlling signals D3, D4, D5 and D6, the detection signal 38 is again sampled 90 for any residuals 92 to determine if the nulling has been effective. The detected signal 38 is sampled and control signal D1 can be varied to measure the amplitude of the detected signal. If the nulling has been effective, then the detection signal is continuously monitored 94 and the microcontroller 50 determines 96 if the nulling has remained effective. The detected power level of the residual of the undesired signal is a measure of the nulling efficiency. When the initial residuals of the detection signal are too high 92 or have subsequently increased due to a slight drift 96, then the reference path parameters are again finely adjusted 98, and the detection signal is again sampled. The reduction of the residuals 90, 92 and 98, or the reduction of the drift 90, 92, 84, 96 and 98 are repeated to reduce the residual or to maintain the undesired detection signal within predetermined limits. The power level of the detected signal 38 is in effect a feedback signal for the closed-loop nulling process. The closed loop nulling process continues until the detected signal disappears 96 and the controller returns to coarse scanning 82 searching for another unwanted signal. When the signal disappears, the reference path is turned off using the control signal D3, D4, D5, and D6 so that the detected signal 38 is not affected by any nulling function in the reference path, so that the scanning 82 reveals unnulled undesired signals.

Referring to FIGS. 1A through 5B, and more particularly to FIGS. 4A, 4B, 5A, and 5B, in a narrowband application, an interfering signal is to be cancelled at the center frequency. The phase information is presented as the offset from a 180° difference in the delay path and reference-path phase transfer functions and set by the phase shifter 24. The delay path has a uniform amplitude transfer function 100. The reference BPF 20 is set at a desired center frequency 101 where the narrowband amplitude transfer function 102 has a maximum amplitude response. The transfer function defines the shape of the response 102 of the BPF 20 characterized by a Q value. When superimposed in the frequency domain over a signal, the response 102 serves to isolate an interfering signal for cancellation. The current controlled resistor 70 in reference path BPF 20 is set at a high-impedance state, and the Q of the filter is at a maximum. If only such narrowband nulls were to be achieved, then the Q of the reference path BPF should be made as large as possible. The delay path has a uniform phase shift response 104 and matches the narrow band phase transfer function 104 of the BPF 20 only at a certain frequency 105 that corresponds to the selected center frequency 101. A narrowband null is achieved by matching the amplitude and phase only at this center frequency 101. Wideband nulls can be generated by flattening and widening the bandpass shape of the reference bandpass filter 20. The delay path retains a flat amplitude transfer function 108. However, the reference BPF 20 is controlled by CCR 70 to have a wide band transfer function 110 centered at the center frequency 109 having a maximum amplitude 109 at the center frequency 109. Biasing the CCR 70 so that its impedance drops to 100 ohm will cause the required reshaping of the reference path BPF 20. The wideband transfer function defines the shape of the response 110 of the BPF 20 characterized by another Q value. The phase transfer function 112 of the BPF 20 during wideband nulling has a saw tooth phase shift response 104 and is matched 113 only at certain frequencies to the delay path phase transfer function 114 of the BPF 20. A narrowband null is achieved by matching the amplitudes and phases at only one frequency. In order to generate a wideband null, the BPF amplitude transfer function must be widened, and the group delay of the delay and reference path must match within an offset. A compromise between a perfect amplitude match and a perfect phase match is required.

The ideal reference path BPF configuration would be that of a tunable brick-wall filter having a variable bandwidth and group delay that is matched to that of the delay path. An alternative could be to improve the steepness of the null sides of the filter response of the BFP 20 to use a programmable acoustic transversal filter whose phase and amplitude characteristics can be controlled independently over a limited bandwidth. Though the null generation would be improved, the transversal filter would cost more and consume more surface area than does the lumped element BPF 20.

Referring to all of the Figures, and more particularly to FIGS. 6A, 6B, 7A, and 7B, the cancellation system can cancel undesired signals and pass desired signals. There is an assumption that the desired signal and the interfering signal are frequency isolated so that cancellation of the interfering signal is possible without simultaneously canceling the desired signal. In the case of a wideband cancellation, a desired signal 116 and a wideband undesired signal 118 are received as the input signal 10. After wideband cancellation by isolating, phase shifting and adding the wideband signal back into the input signal 10 using the reference path and directional coupler 14, to effectively subtract the wideband signal 118 from the input signal, the undesired wideband signal 118 is effectively removed save only an undesired wideband remnant portion 120. Likewise, in the case of a narrowband cancellation, a desired signal 122 and a narrowband undesired signal 124 are received as the input signal 10. After narrowband cancellation by isolating, phase shifting and adding the wideband signal to the input signal 10 using the reference path and directional coupler 14, to effectively subtract the narrowband signal 124 from the input signal 10, the undesired narrowband signal 124 is effectively removed save only an undesired narrowband remnant portion 126.

The cancellation system samples the interfering signals of the input signal by sampling the detection baseband signal at selected bandwidths. The cancellation system detects an interfering signal and characterizes the interfering signal with respect to frequency, pulse-width length or cw, and amplitude. The baseband detection signal 38 is characterized as to pulse-width or cw, amplitude, and frequency bandwidth and these parameters can be compared against parameter definitions of the undesired signals that are stored in the microcontroller 50 to determine if the detected signal is desired or undesired. Characterization of the baseband detection signal is achieved in the digital control circuit using the pulse width detection circuit 44, cw detection circuit 46, threshold comparator 42 and the A/D converter 40. Once an interfering cw or pulse signal is detected, the microcontroller 50 initiates the cancellation sequence. The polling for interfering signal detection occurs at a predetermined rate, for example, every 0.05 s, the shortest internal programmable delay time allowed by the microcontroller. The microcontroller 50 operates to multiplex the polling of the signal detection from the pulse detection circuit 44 or the cw detection circuit 46. The pulse width detection circuit 44 rejects cw signals but detects pulse width signals. The pulse width detection circuit 44 detects rising and falling edges of the pulse for determining the timing duration of the pulse. The circuit 44 compares the width of the detected pulse to a preset pulse width, for example, 200 ns. If the detected pulse is longer or shorter than this preset value, then a pulse detection signal is communicated to the microcontroller 50. Concurrently, the amplitude of the pulse is measured by the A/D converter 40. The cw detection circuit 46 operates once the detection BPF 30 is set to a specific frequency. The microcontroller .50 samples the output of the comparator 42 through the cw detection circuit 46 and the selector 48 every 100 ns for 1 ms. The 1 ms time limit is the dwell time that the detection BPF 40 stays at a single frequency. If a cw signal is detected for a greater than a predetermined masking period so as to reject pulse signals, then the cw signal detect condition is set. The masking period and the dwell time are predetermined values stored in the microcontroller 50. The cw detection circuit 46 provides a cw detection signal to the microcontroller.

The microcontroller 50 stores the definition of the undesired signals, manages signal detection, characterizes any undesired signals, outputs control signals to the reference path for phase shifting, AGC setting and bandwidth frequency nulling, monitors the nulling efficiency, and adjusts the reference path to optimize the null depth. The microcontroller 50 first scans the frequency range searching for detected signal in the detection path across the 60 MHz wide operating bandwidth in coarse 2 MHz steps to detect a signal. The desired detection threshold is loaded into the comparator 42 at each frequency location. The microcontroller 60 then monitors the multiplexed outputs of the pulse and cw detection circuitry 44 and 46. If a detected signal does not meet the undesired signal definition, the controller just repeats the scanning process. During all scanning operations, the signal transmission through the reference path would be disabled by setting the attenuation of the reference-path VGA to a maximum value.

When an interfering cw signal whose baseband amplitude exceeds that of the detection threshold is being received in the operating bandwidth during the coarse-scan process, the frequency location, coarse-bandwidth, and amplitude of this undesired signal is determined. After a scan of the entire operating bandwidth had been completed, the center frequency location of the selected largest amplitude signal is determined. The microcontroller 50 then starts a fine frequency scan within ±5 MHz around the center frequency in steps of 0.4 MHz in order to determine the magnitude and frequency bandwidth of the interfering signal around the center frequency. This bandwidth determination is used to set the controller to narrowband or wideband mode. During the fine frequency scans, the controller adaptively adjusts the AGC setting in the detection path to avoid saturating the detection diode 34. In this manner, an automatic gain control process is used to adjust the 20 dB dynamic range of the detection diode 34 to bracket the amplitude of the detected interfering signal.

The controller contains a predetermined lookup table of the parameter values of the reference path phase shift, AGC setting and bandwidth tuning voltages of the reference path. The coarse table consists of only a few frequency points. An interpolation routine uses the center frequency to determine the required reference path parameter values. The interpolated values are then output to the reference path components using the control signal D3, D4, D5 and D6. This adjusted version of the reference signal is then vector summed in the directional coupler 14. In order to detect the reduced amplitude of the interfering signal, the AGC attenuation in the detection path is decreased by an assumed set value of approximately 20 dB. Thus, any remnant of the interfering signal can be measured.

The controller then monitors the magnitude of the remnant of the interfering RF signal, and adjusts the reference path parameters to minimize the value of the remnant residual interfering signal. The values of the reference path components are separately adjusted ±10% around the previously determined interpolated values. A simple minimum value search routine is used to determine the optimum set of reference path parameter settings that minimize the value of the residual signal. If the optimization process causes the magnitude of the residual signal to drop below the detection threshold, the AGC attenuation setting of the detection-path VGA is decreased so that the residual signal can again be detected. At the end of the optimization process, the controller monitors the final residual value of the interfering signal. Several conditions are tested to determine whether the interfering signal is drifting in amplitude or frequency.

The microcontroller 50 can employ various algorithms for the detection and cancellation of undesired signal. Square law detection in combination with threshold level determines the presence of a signal. In the preferred form, a detected signal is determined to be a desired or undesired pulse signal, relative to the preset pulse duration. If desired, the signal is determined to be a desired or undesired cw signal. CW or pulse mode detection, square law amplitude detection and frequency scanning detection are used to characterize a detected signal. A lookup table can be used to identify the required reference path control signal D3, D4, D5 and D6 values. The frequency location of the undesired signal is cross referenced in a lookup table to determine reference path parameters for controlling the reference path to canceling the undesired signals from the composite input signal consisting of both desired and undesired signals. The lookup table may be, by way of example for narrowband detection, a table having a plurality of scanned detection center frequencies F1, F2, F3 through Fn cross referenced to respective VGA amplitudes A1, A2, A3 through An, phase θ1, θ2, θ3, through θn, and BPF center frequencies f1, f2, f3, through fn. When, for example, a signal is detected as a narrowband signal at a center frequency of F2, the reference path is controlled to have a center frequency of f2, a phase shift of θ2, and an amplitude of A2, but over a predetermined narrowband of operation. The lookup table may further include, by way of example for wideband detection, a lookup table having a plurality of scanned detection center frequencies F1, F2, F3, through Fn over a predetermined wideband and cross referenced to respective VGA amplitudes A1, A2, A3, through An, phases θ1, θ2, θ3, through θn, and BPF center frequencies f1, f2, f3, through fn, and current control resistor values R1, R2, R3, and RN, for providing bandwidths b1, b2, b3, and bN, respectively. When, for example, a signal is detected over a wideband by having substantial amplitudinal component over the wideband, but centered at a center frequency of F2, the reference path is controlled to have a center frequency of f2, a phase shift of θ2, an amplitude of A2, a current controlled resistor value R2, for providing a bandwidth b2, of the reference BPF 20. In this manner, the microcontroller 50 can detect the presence of signal, characterize the detected signal, and if unwanted, automatically control the reference path to cancel the unwanted signal.

The present invention is characterized by a detection path for detecting the presence of desired and undesired signals. When an undesired signal is detected, a reference path is controlled to isolate the undesired signal and subtract it from the input signal so that only the desire signal survives without apriori information of the undesired signal and without the use of beam nulling or external undesired signal samples. Those skilled in the art can make enhancements, improvements, and modifications to the invention, and these enhancements, improvements, and modifications may nonetheless fall within the spirit and scope of the following claims.

What is claimed is:

1. A method of canceling an undesired signal from an input signal, the method comprising the steps of, receiving the input signal, scanning the input signal over a frequency operating bandwidth, detecting the presence of a detected signal having frequency components within the frequency operating bandwidth, determining when the detected signal is the undesired signal, determining when the detected signal is a pulse signal, determining when the detected signal is a continues wave signal, determining when the detected signal is the undesirable signal when the pulse signal has a duration greater than a preset value, determining when the detected signal is the undesirable signal when the continuous wave signal has the detected center frequency and the detected bandwidth respectively different than a predetermined desired center frequency and a predetermined desired bandwidth, isolating the detected signal within a frequency bandwidth as an isolated undesired signal, and subtracting the isolated undesired signal from the input signal.

2. The method of claim 1 wherein, the scanning step determines a detected bandwidth of the detected signal, and the isolating step isolates the undesired signal over the detected bandwidth.

3. The method of claim 1 wherein the subtracting step, scanning step determines a detected bandwidth of the detected signal, the isolating step isolates the undesired signal over the detected bandwidth, and the subtracting step phase delays the isolated undesired signal for coherent subtraction of the isolated undesired signal from the input signal during the subtraction step.

4. The method of claim 1 wherein, the scanning step determines the amplitude of the detected signal, and the subtracting step adjusts an amplitude of the isolated undesired signal for matched amplitude subtraction during the subtraction step.

5. The method of claim 1 wherein the detecting step comprises the steps of, initially detecting the presence of the detected signal in the input signal in the absence of subtracting the isolated undesired signal from the input signal, and remnant detecting the presence of a remnant of the undesired signal above a threshold level in the input signal in the presence of subtracting the isolated undesired signal from the input signal.

6. The method of claim 5 further comprising the step of, remnant isolating the remnant of the undesired signal when above the threshold level, and remnant subtracting the remnant of the undesired signal from the input signal to reduce the remnant below the threshold level.

7. The method of claim 1 wherein the scanning step comprises the steps of coarse scanning the operating frequency bandwidth in coarse bandwidth steps until detecting the presence of the detected signal, finely scanning a reduced operating bandwidth in fine bandwidth step for determining the detected bandwidth and detected center frequency of the detecting signal, determining when the detected bandwidth is narrowband when less than a predetermined bandwidth value, and determining when the detected bandwidth is wideband when greater than the predetermined bandwidth value.

8. The method of claim 7, wherein, the isolating step isolates the undesired signal over a wide bandwidth when the detected bandwidth is wideband, and the isolating step isolates the undesired signal over a narrow bandwidth when the detected bandwidth is narrowband.

9. A method of canceling an undesired signal from an input signal, the method comprising the steps of, receiving the input signal, coarsely scanning the input signal for a detected signal over a frequency operating bandwidth in coarse bandwidth steps, detecting the presence of the detected signal within one of the bandwidth steps when the detected signal has a detected amplitude above a threshold level, finely scanning the input signal for determining a detected center frequency of the detected signal, a detected bandwidth of the detected signal and the detected amplitude of the detected when above the threshold level, determining when the detected signal is a wideband detected signal or a narrowband detected signal when the detected bandwidth is greater or lesser, respectively, than a predetermined bandwidth, determining when the detected signal is the undesired signal, determining when the detected signal is a pulse signal, determining when the detected signal is a continues wave signal, determining when the detected signal is the undesirable signal when the pulse signal has a duration greater than a preset value, and determining when the detected signal is the undesirable signal when the continuous wave signal has the detected center frequency and the detected bandwidth respectively different than a predetermined desired center frequency and a predetermined desired bandwidth, isolating the detected signal within an isolating frequency bandwidth as an isolated undesired signal, the isolating frequency bandwidth is an isolating wide bandwidth or an isolating narrow bandwidth when the detected signal is respectively wideband or narrowband, amplifying the isolated undesired signal to an isolated amplitude to match the detected amplitude, phase shifting the isolated undesired signal by an isolated phase for coherency with the input signal, and subtracting the amplified, phase shifted, isolated undesired signal from the input signal.

10. The method of claim 9 further comprising the step of, cross referencing the detected center frequency and detected amplitude of the detected narrowband signal to the isolating center frequency, the isolating amplitude, the isolating phase, and the isolating narrow bandwidth.

11. The method of claim 9 further comprising the step of, cross referencing the detected center frequency and detected amplitude of the detected wideband signal to the center frequency of the isolating center frequency, isolated amplitude, isolating phase, and isolating wide bandwidth.

* * * * *